United States Patent [19]

Newcomb

[11] Patent Number: 4,785,308

[45] Date of Patent: Nov. 15, 1988

[54] ANTENNA

[75] Inventor: Donald R. Newcomb, Lockhart, Tex.

[73] Assignee: Butternut Electronic Company, Lockhart, Tex.

[21] Appl. No.: 819,713

[22] Filed: Jan. 17, 1986

Related U.S. Application Data

[63] Continuation-in-part of Ser. No. 485,783, Apr. 18, 1983, Pat. No. 4,593,289.

[51] Int. Cl.$^4$ .............................................. H01Q 9/28
[52] U.S. Cl. .................................. 343/795; 343/747; 343/818
[58] Field of Search ........................ 343/795, 747, 818

[56] References Cited

U.S. PATENT DOCUMENTS

| | | | |
|---|---|---|---|
| 2,175,253 | 10/1939 | Carter | 343/795 |
| 2,591,790 | 4/1952 | Denson | 343/795 |
| 2,640,934 | 6/1953 | Lago | 343/795 |
| 4,161,737 | 7/1979 | Albright | 343/895 |

Primary Examiner—William L. Sikes
Assistant Examiner—Robert E. Wise
Attorney, Agent, or Firm—Hugh D. Jaeger

[57] ABSTRACT

Antenna for operation on a plurality of frequencies, the antenna including apex fed opposing swept elements and a plurality of stubs parallel to a central element, a plurality of capacitors connected between one end of the central element and ends of the stubs, and a coaxial cable connected to the opposing swept elements. Each swept element has a triangular configuration with a central element running from the apex to the base of the triangle at a perpendicular intersection. Plural matching stubs connect from the coaxial fed apex and parallel along the central tube, secured at the other end with clamps or capacitors. Ceramic doorknob capacitors connect between the coaxial fed apex and a free end of the first stub and between the first and second stub ends. A hairpin coil can be utilized between the apex fed and the first capacitor. A matching end can connect across the feed point at a common matching stub point for the swept elements. A plurality of apex fed opposing swept elements positioned on a boom provides a beam antenna when using a driven element and a reflector element, and additionally a director element. The antenna can operate on plural frequencies such as 20 meters, 15 meters, and 10 meters in the amateur radio spectrum or on any other frequencies in the HF or higher spectrum. An inductor and two ceramic capacitors are shunted across the 10M–15M circuitry of the driven element for 12M or 17M operation.

5 Claims, 7 Drawing Sheets

ANTENNA

CROSS REFERENCES TO CO-PENDING APPLICATIONS

This is a continuation-in-part of Ser. No. 485,783, filed Apr. 18, 1983 now U.S. Pat. No. 4,593,289.

BACKGROUND OF THE INVENTION

1. Field of the Invention

The present invention pertains to an antenna, and more particularly, pertains to at least a swept element and at least three-frequency antenna for utilization in the amateur radio frequency spectrum, the military frequency spectrum, the HF spectrum, or the professional communications frequency spectrum. The beam antenna can operate on a plurality of frequencies.

2. Description of the Prior Art

The prior art triband beam antennas have been complex mechanical structures requiring traps for resonance on predetermined designated frequencies. The prior art beam antennas and antennas in general have usually been extremely large in size, mechanically and electrically, and also expensive to the individual user due to the amount of metal and electrical circuitry in the tune traps of the beam antenna. The resultant beam antenna was a large mechanical structure, an electrical structure with traps which had inherent problems either of opening up or burning shorted, and an antenna, while realistically used, had a limited life due to mechanical and electrical failures in the traps.

Also, another problem with the beam antennas was matching the antenna with a desired coaxial impedance, having a wide bandwidth, having a determined usable resonant center frequency, and having a structure which was mechanically rotatable. Prior art structures required large size arrays.

The present invention overcomes the disadvantages of the prior art by providing an apex fed opposing swept element beam antenna which can also be utilized as a monopole or dipole antenna and which includes a relatively reduced physical size of antenna with a minimal reduction in bandwidth, and an antenna which is not mechanically or electrically broken for traps as known in the prior art.

SUMMARY OF THE INVENTION

The general purpose of the present invention is to provide an apex fed opposing swept element beam antenna for operation on a plurality of frequencies such as 20 meters, 15 meters, and 10 meters, and utilizing elements which are of reduced short and physical structure with a minimal reduction in bandwidth. The antenna utilizes a flat-top rod base of an inverted triangle for a monopole configuration providing the fundamental operating theory, and providing an antenna which has high efficiency and maximum bandwidth in that the radiator is radiating on all frequencies. Further, the antenna as a dipole is electrically concurrent and is not electrically or mechanically isolated as in the prior art. The beam can also operate on 12 and 17 meters.

According to one embodiment of the present invention, there is provided an apex fed opposing swept dipole element including cylindrical fiberglass rod support, a right and left central tubular element extending therefrom secured with nut-and-bolt assemblies, a right end rod element and a left end rod element secured at substantially right angles to the outer ends of the central tubular elements with a clamp and nut-and-bolt assembly, upper and lower right swept rod elements and upper and lower left swept rod elements, and clamps securing the outer ends of the swept rod elements to the upper and lower ends of the end rod elements with clamp and nut-and-bolt assemblies, and the inner ends of the swept rod elements are secured to the inner end of the central tubular elements adjacent the fiberglass rod support with clamp and nut-and-bolt assemblies, upper left and right stubs, upper left and right shorting clamps at the outer end of the stubs and secured between the outer ends of the stubs and to a mid-portion of the central tubular element with clamps and nut-and-bolt assemblies, right and left dielectric supports securing the inner ends of the stubs to the inner end of the central tubular element, a right and left capacitor such as a ceramic doorknob capacitor secured along with an inductance coil between the inner end of the central tubular elements and the inner end of the first stubs, and lower second right and left stubs, a shorting clamp between each inner end of the second stub and an inner end of the first stub, a left and right ceramic doorknob capacitor connected between the outer ends of the first and second upper and lower left and right stubs and a coaxial feed line connected between the feed points of the two opposing apex fed swept elements. At the junction of the inner ends of the first stubs tied to a lower end of the ceramic capacitor of the first stub and the inner ends of the first and second lower stubs, a hairpin inductor coil can connect across the feed point.

Another embodiment of the present invention illustrates the beam of FIGS. 5-7 which is for operation on 2, 17, 15, 12 and 10 meters, utilizing the same principles of operation but slightly different structure in utilizing a lesser number of ceramic capacitors in view of an increased number of frequencies of operation.

The antenna can be utilized as a directional array with a plurality of elements including at least a reflector element and can also include a plurality of director elements in addition to the driven element.

One significant aspect and feature of the present invention is that the apex fed opposing swept element antenna can be utilized as either a monopole or a dipole, or a directional array with more than one element.

Another significant aspect and feature of the present invention is an antenna which is not mechanically or electrically broken and not utilizing loading coils or traps, thereby providing an unusually high efficiency and bandwidth.

A further significant aspect and feature of the present invention is an antenna which provides that a parasitic director can be utilized with closer than normal spacing to produce an improved front-to-back ratio without sacrificing significant gain.

An additional significant aspect and feature of the present invention is an antenna which mechanically and electrically is reduced in size to comparable prior art antennas.

Having thus described embodiments of the present invention, it is a principal object thereof to provide an apex fed opposing swept element antenna in either a monopole, dipole, or beam array configuration.

One object of the present invention is an antenna with apex fed opposing swept elements providing unusually high efficiency antenna with maximum bandwidth, and a physical and electrical reduction in antenna length based on the theory that the support structure is not electrically and mechanically broken or coiled trap inductors.

Another object of the present invention is an apex fed opposing swept element array providing broadband coverage with a flat-top rod of a base of an inverted triangle.

A further object of the present invention is an array capable of operation over fire different frequency segments.

BRIEF DESCRIPTION OF THE DRAWINGS

Other objects and many of the attendant advantages of the present invention will be readily understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
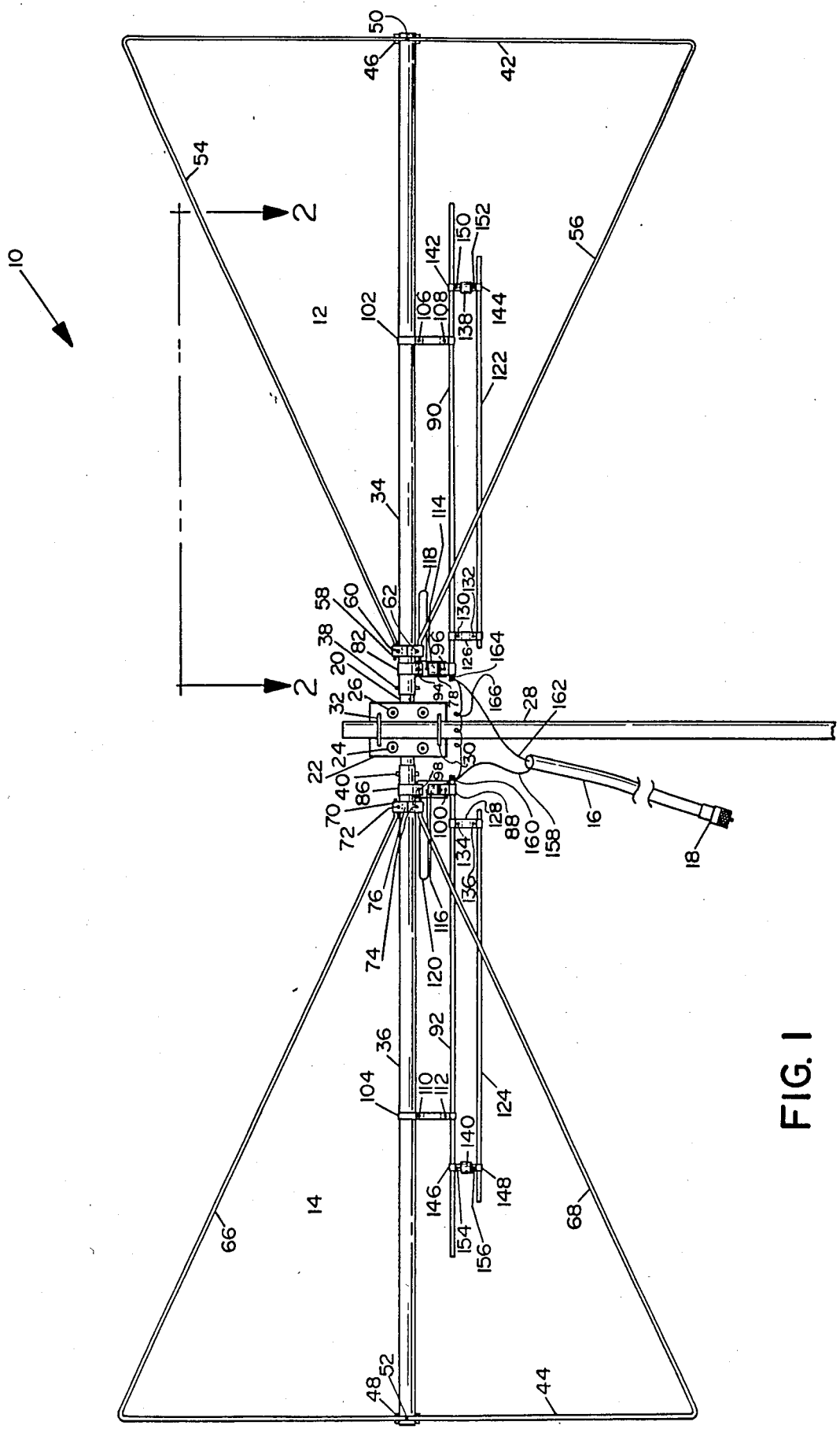
FIG. 1 illustrates a dipole configuration of an apex fed opposing swept element antenna.

FIG. 1 illustrates a plan view of an antenna 10, the present invention, illustrating a dipole configuration of an apex fed opposing swept element antenna including a right swept element assembly 12, a left swept element assembly 14, a coaxial feed line 16 connected between the assemblies 12 and 14 as later described in detail through a coaxial connector 18 or the like.

The right element assembly 12 and left element assembly 14 are supported about a cylindrical fiberglass rod support 20, the rod support 20 secured to a mast support 22 with two U-bolt assemblies 24 and 26, mast support 22 then secured to a boom 28 with two U-bolt assemblies 30 and 32. The U-bolt assemblies include U-bolts, washers, lock washers, and nuts which are not numbered or detailed for the sake of brevity in this disclosure.

Figure 3:
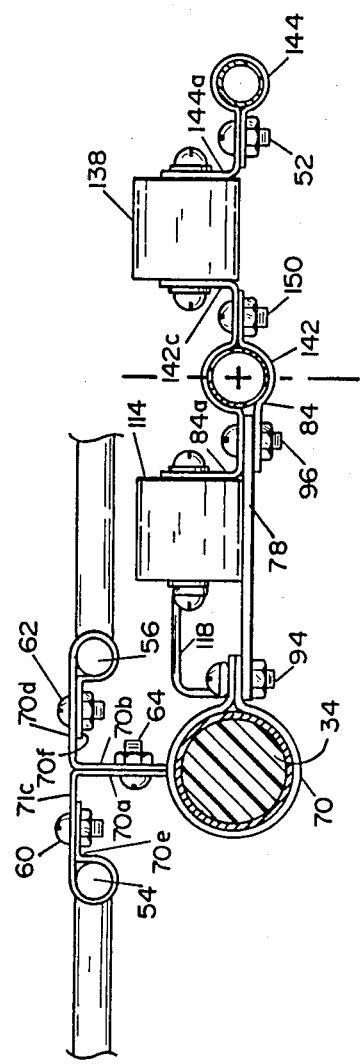
FIG. 3 illustrates an end view taken along line 3—3 of FIG. 2.

A right central tubular member 34 and a left central tubular member 36 telescope over opposing ends of the cylindrical fiberglass rod support 20, and are secured thereto with nut-and-bolt assemblies 28 and 40 respectively. A right end rod element 42 and a left end rod element 44 secure to the outer ends of the central tubular elements 34 and 36 with clamps 46 and 48 and nut-and-bolt assemblies 50 and 52. An upper right swept rod element 54 and a lower right swept rod element 56 extend from the opposing ends of the element 42 to the inner end of the central tubular element 34 and are appropriately secured with clamp 58, as also illustrated in FIG. 3, and nut-and-bolt assemblies 60, 62, and 64 of FIG. 3. These swept elements can be provided either with a slight curvature or can be substantially straight. Likewise, an upper left swept rod element 66 and a lower left swept rod element 68 are secured with wrap-around configured clamp 74 and nut-and-bolt assemblies 72, 74, and 76. Right and left dielectric supports 78 and 80 secure between the inner ends of the central tubular elements 34 and 36, respectively, and between the inner ends of upper right stub and upper left stubs 82 and 84 with clamps 86, 88, 90 and 92 with nut-and-bolt assemblies 94, 96, 98 and 100. Upper right and upper left shorting clamps 102 and 104 secure between the outer end portion of the stubs 82 and 84 and mid-portion of the central tubular elements 34 and 36 with nut-and-bolt assemblies 106, 108, 110, and 112. Upper right and upper left capacitors 114 and 116, such as ceramic doorknob capacitors or the like, are supported on the dielectric supports 86 and 88 and electrically connect one end to the inner end of the stubs 82 and 84. Inductor coils 118 and 120, which in this instance are hairpin coils or extended pieces of wire, connect from nut-and-bolt assemblies 94 and 96 to the other end of the dielectric capacitors. The ceramic doorknob capacitors in this particular example include bolt and washer connection for facilitating connections between the stubs and the coil members. A lower right stub 122 and a lower left stub 124 of a slightly shorter length than the stubs 82 and 84 position below the stubs 82 and 84. A lower right shorting clamp 126 and a lower left shorting clamp 128 connect between the end of the stubs 122 and 124 and the stubs 82 and 84 with nut-and-bolt assemblies 130, 132, 134, and 136. A lower right capacitor 138 and a lower left capacitor 140 electrically connect between the approximate ends of the respective stubs 126 and 82, and 128 and 84 with right-angle encompassing clamps 142, 144, 146, and 148 with bolts 150, 152, 154, and 156 secured through the clamps to the internal threads of the capacitors 138 and 140. The coaxial line 16, connected to the coaxial connector 18, connects the outer conductor 158 of the coaxial cable to 16 and the inner conductor 162 of the coaxial cable 16 at feed points 160 and 164. A hairpin coil 166 can be provided between the feed points for impedance matching.

Figure 2:
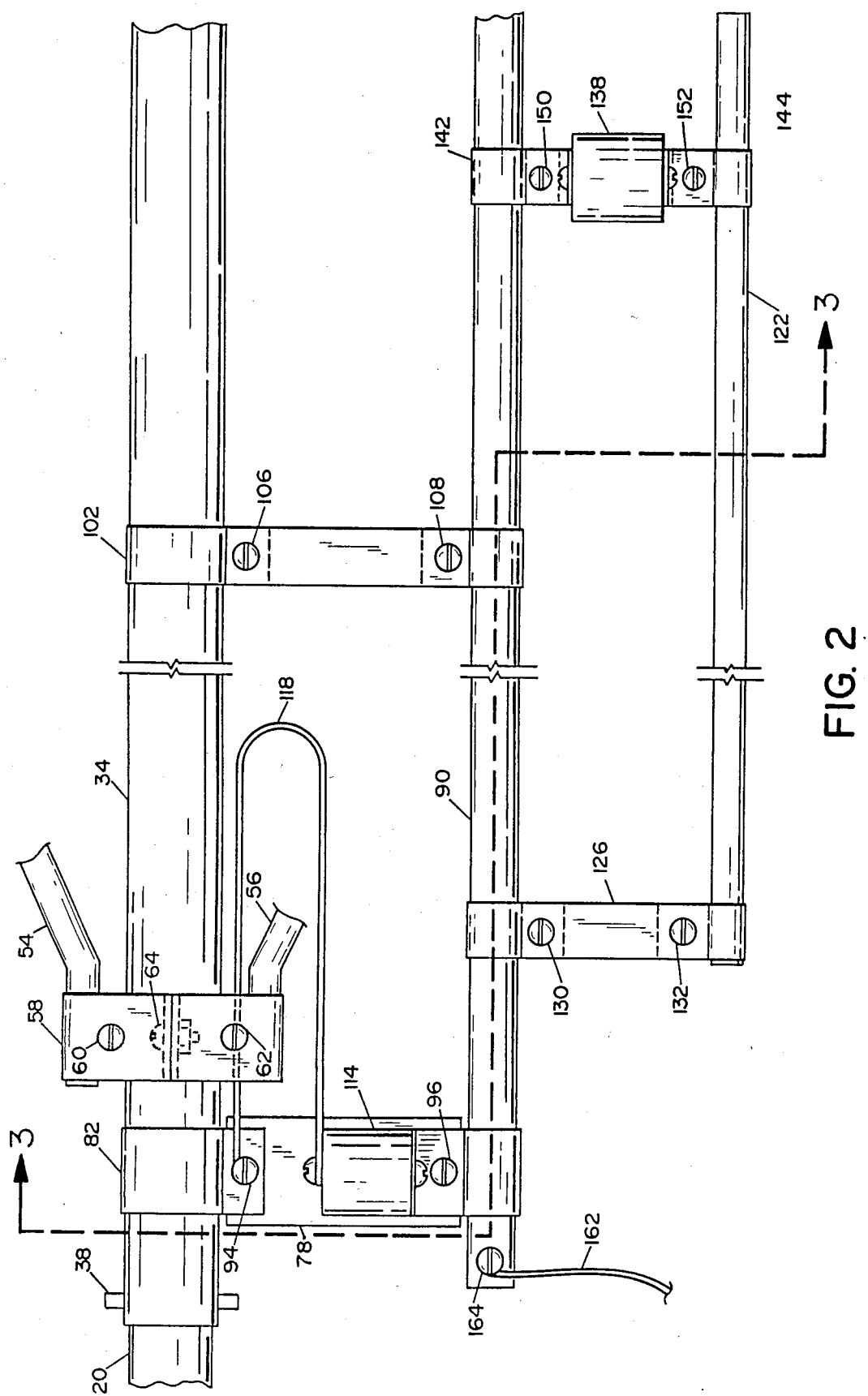
FIG. 2 illustrates an enlarged view of the apex feed point and stub tuning structure taken along line 2—2 of FIG. 1.

FIG. 2 illustrates an enlarged view of the feed point area about the apex fed opposing swept element assemblies 12 and 14. The particular detail of the capacitors 114 and 116 and 138 and 140 and the hairpin inductor coils 118 and 120 is illustrated. The mechanized clamps are "wrap-around" element clamps with right-angle bends as required. The stubs 90, 92, 122, and 124 can be in an angular plane to the plane of the swept elements, providing for clearance of the hairpin coils 118 and 120 and the stubs. Sufficient clearance is provided as illustrated in FIG. 3 and there is no interaction on the amateur frequencies.

FIG. 3 illustrates a view taken along line 3—3 of FIG. 2 where all numerals correspond to those elements previously described. Particular attention is noted to the wrap-around clamps encompassing the circumferential area about the elements and including a sufficient overlap for securing by nut-and-bolt assemblies where appropriate or directly to the appropriate end of the tubular ceramic doorknob high-voltage capacitors. This particular bending of the clamps, as well as utilization of a single bolt to each end of the tubular capacitor, provides for a least number of mechanical components with assured structural integrity and stability of the matching stubs.

FIG. 3 particularly shows the orientation of the dielectric support 78 connected between the two clamps 82 and 84 secured thereto with nut-and-bolt assemblies 94 and 96. The capacitor 114 connects onto a right-angle lip 84a of clamp 84 with a bolt and washer at one end. The other end connects with a bolt and washer to the end of the hairpin coil 118. This provides an inductor 118-capacitor 114 connection between the central element 34 and the upper stub 82. The lower stub 122 positions with the clamp 126 and nut-and-bolt assemblies 130 and 132 at one end; and, by the wrap-around clamps 142 and 144 with right-angle lips 142a and 144, bolts 150 and 152 to the capacitor 138.

Clamp 70 can be described as a wrap-around clamp with a right-angle bend, a second and opposing wrap-around bend with lips extending therefrom where the right-angle bend is secured by nut-and-bolt assemblies 60 and 62. The dielectric member can be any suitable plastic, Teflon or the like. Clamp 84 is configured as a wrap-around with a lip and with space for accommodating the dielectric insulator 78. Clamps 142 and 144 are wrap-around including securing by nut-and-bolt assemblies 150 and 152 and including lips 142a and 144a for securing the tubular capacitor therebetween with suitable bolts and washers.

MODE OF OPERATION

The apex fed opposing swept element antenna 10 can be constructed with 1.125" aluminum tubing for the central support tubular elements 34 and 36 with surrounding 3/16" rod for the end rod elements 42 and 44 and the upper and lower right and left swept elements. The gamma rods 70 and 72 and 122 and 124 can also be 3/16" rod or ⅛" tubing.

This particular antenna lends itself to operation in the amateur radio frequencies at 20 meters, 15 meters, and 10 meters. The antenna provides a substantially flat standing wave ratio over a 600 Khz portion of the frequencies where the wing span is electrically greater than one-half wavelength. The parasitic director provides closer than normal spacing with significant better front-to-back ratio without sacrificing gain over the prior art antennas. The element size is approximately and substantially one-third that of the prior art antennas. The tubular ceramic doorknob capacitors are 67 pf capacitors or an equivalent value.

At 20 meters, the wing span is approximately twelve to thirteen feet. A quarter wave matching line may be required and can be utilized at 75 ohm coaxial cable between the feed line and the feed point depending upon the output of the transmitter.

The theory of the apex fed opposing swept element antenna design can be described as a first parallel circuit of inductance-capacitance and a second parallel circuit tapped across the inductance of the first parallel circuit. The first stubs 82 and 84 provide resonance on 10 meters and 20 meters with a second resonant at 10 meters. The second stubs 122 and 124 provide for resonance at 15 meters.

ALTERNATIVE EMBODIMENT OF DIRECTIONAL ARRAY ANTENNA

Figure 4:
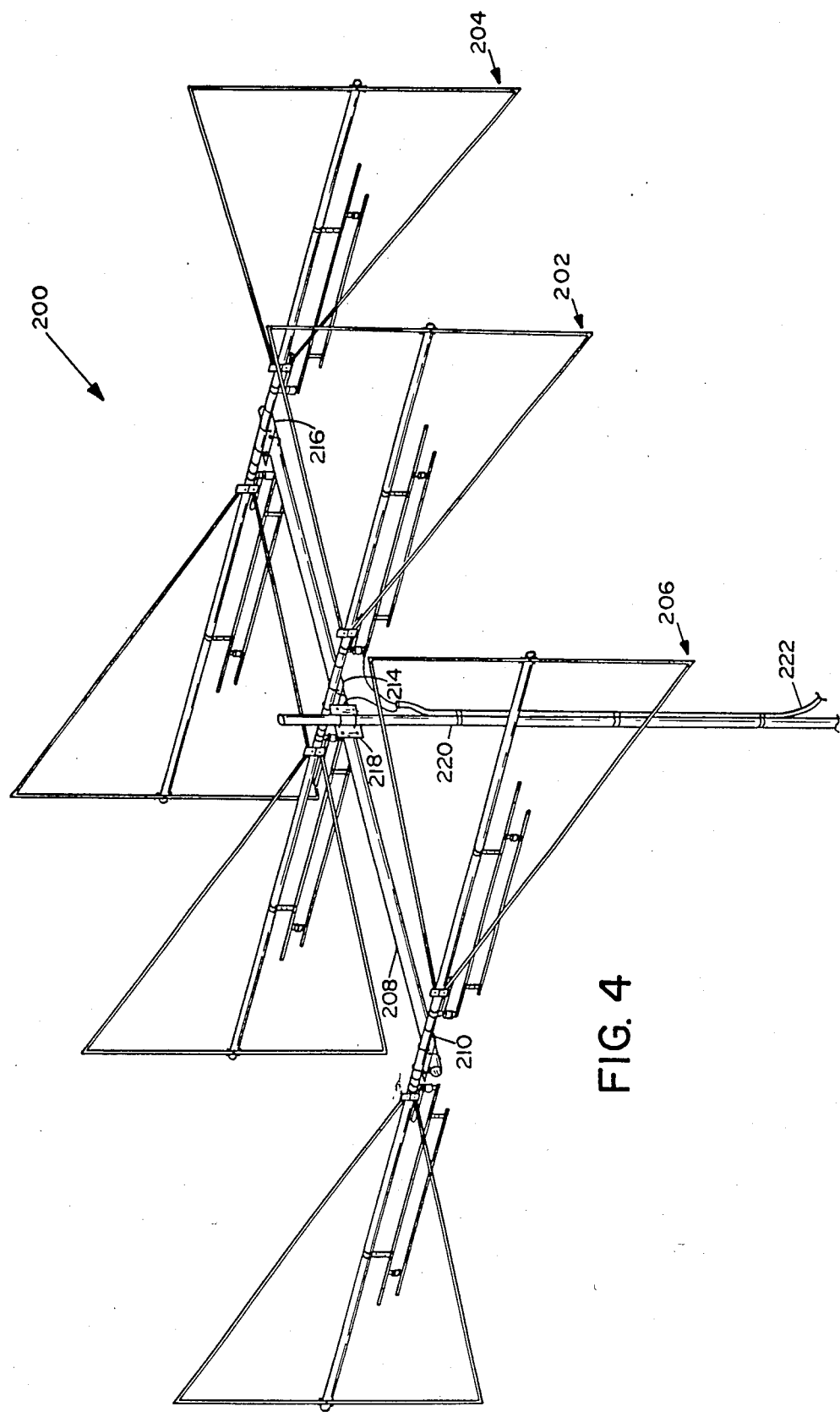
FIG. 4 illustrates a perspective view of a beam array utilizing a reflector, driven element, and director of the apex fed opposing swept element dipoles.

FIG. 4 illustrates a perspective view of a beam antenna 200 including a driven element 202, a reflector element 204, and a director element 206, where all of the elements are apex fed opposing swept elements as previously disclosed in FIGS. 1–3.

The elements 202–206 are supported on a boom 208 with boom supporting plates 210, 214, and 216 with U-bolt assemblies securing the center insulator of each element to the boom plate, and U-bolt assemblies securing the boom plate to the boom 208. A mast support 218 secures the boom 208 to the mast 220 with U-bolt assemblies.

Each apex fed opposing swept element including the driven element, the director element, and the reflector element is physically identical or substantially identical where the amount of inductance added to the L-C circuit provides that one of the designated elements can be a director of high tuning the element and the other element can be a reflector element by low tuning the element. By appropriately adjusting the inductance, the element designation is accordingly. A coaxial feed line 222 connects to the driven element 202 as previously described for coupling of radio frequency energy to the driven element.

ADDITIONAL EMBODIMENT OF DIRECTIONAL ARRAY ANTENNA

Figure 5:
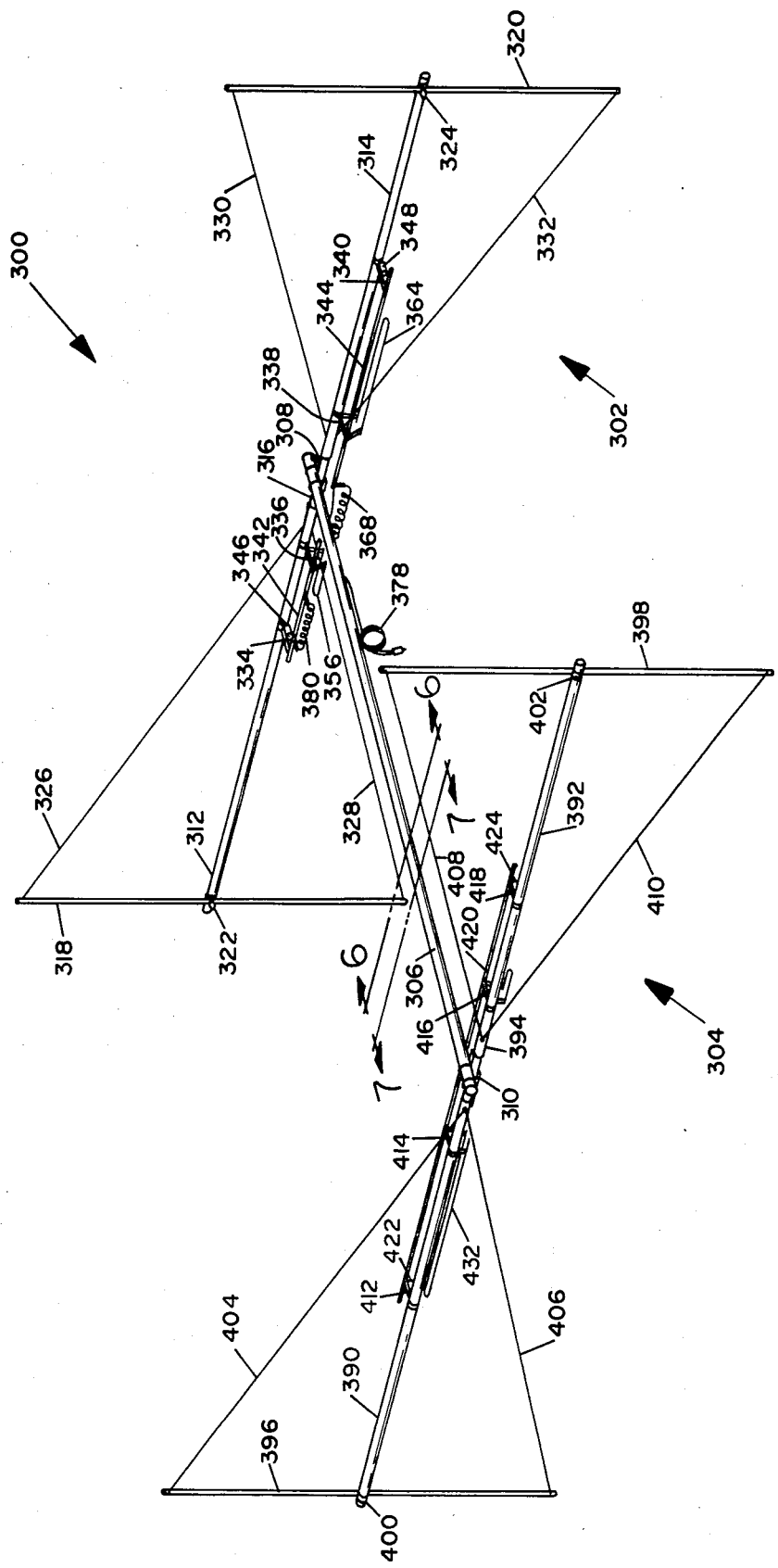
FIG. 5 illustrates a perspective view of a multiband beam array using a driven element and a reflector of apex fed opposing swept element dipoles.
Figure 6:
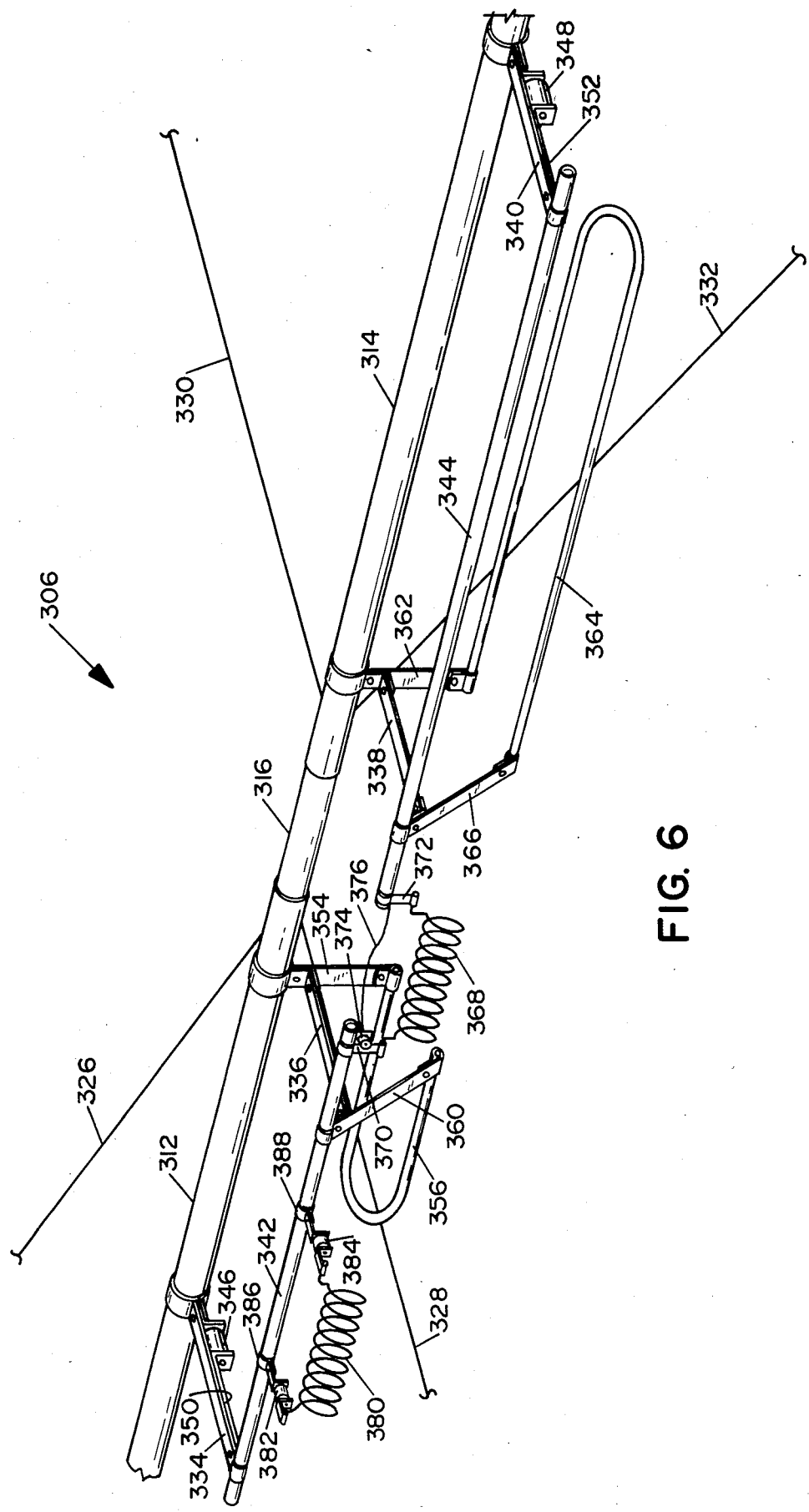
FIG. 6 illustrates a view of the matching and tuning elements of the driven element as viewed from line 6—6 of FIG. 5; and, FIG. 7 illustrates a view of the matching and tuning reflector element as viewed from line 7—7 of FIG. 5.
Figure 7:
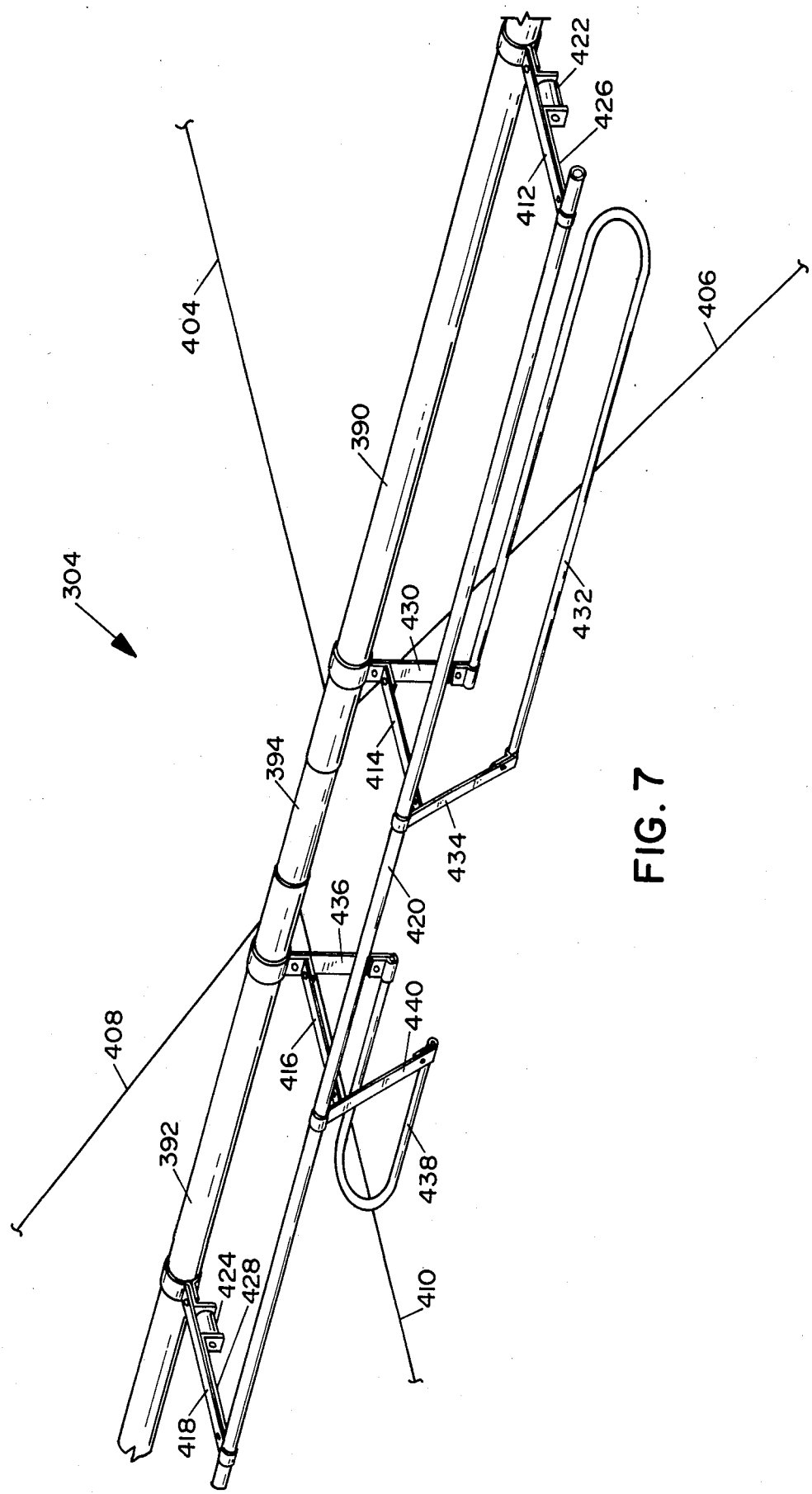

FIG. 5 illustrates a perspective view of a beam antenna 300 including a driven element 302 and a reflector element 304 where all of the elements are apex fed opposing elements as described herein with reference made to detail illustrations of FIGS. 6 and 7. The driven element 302 and the reflector 304 and supported on a boom 306 with boom U-bolt support plates 308 and 310 securing over and about fiberglass center insulator rods described later. The boom U-bolt assemblies include washers, lock washers, and nuts, as do other clamping devices, which are not numbered or detailed for sake of brevity in this disclosure.

The driven element 302 includes central tubular members 312 and 314 which telescopes over opposing end of the cylindrical rod support rod 316. A left rod element 318 and a right rod element 320 secure to the outer ends of the central tubular members 312 and 314 with clamps 322 and 324. Upper and lower left wire elements 326 and 328 secure at the end points of the left rod element 318 and secure together at the inner portion to the central tubular member 312. Right upper and lower wire elements 330 and 332 secure in a similar fashion from the end points of the right element rod 320 to the inner portion of the central tube element 314. Dielectric supports 334, 336, 338 and 340 secure to central tube members 312 and 314 respectively, and secures the short left stub 342 to central tube element 312 and short right stub 344 to central tube element 314. Left and right ceramic capacitors 346 and 348 secure between double ended capacitor brackets 350 and 352 and beneath dielectric support 334 and 340 respectively, as well as between central tube member 312 and stub 342 and between central tube member 314 and stub 344. Shorting bar 354 connects between the inner end portion of central tube member 312 to one end of the dielectric support 336 and to one end of the short hairpin stub 356, while shorting bar 360 connects the opposing end of the hairpin stub 356 to stub 342 and the opposite end of dielectric support 336. In a like fashion, a shorting bar 362 connects between the inner portion of the central tube element 314 to one end of the dielectric support 338 and to one end of the long hairpin stub 364, while shorting bar 366 connects the opposing end of the hairpin stub 364 to stub 344. An inductor 368 secures between stubs 342 and 344 with clamps 370 and 372, respectively. A coaxial bracket and connector 374 secure to the inner end point of stub 342 with the center coupling wire 376 connecting beneath clamp 372 to the longer stub 344. A coaxial balun coil 378 mounts appropriately to the boom 306 and connects to coaxial connector 374 to feed the driven element. An inductor 380 secures to stub 342 through ceramic capacitors 382 and 384 and respective brackets 386 and 388.

The reflector element 304 includes central tubular members 390 and 392 which telescope over opposing ends of the cylindrical support rod 394. A left rod element 396 and a right rod element 398 secure to the outer ends of the central tubular elements 390 and 392 with clamps 400 and 402. Upper and lower left wire elements 404 and 406 secure at the end points of the left rod element 396 and secure together to the inner portion of the central tubular element 390. Right upper and lower wire element 408 and 410 secure in a like manner from the end points of the right element rod 398 to the inner portion of the central tube member 392. Dielectric supports 412, 414, 416 and 418 secure to the central tube elements 390 and 392, respectively, and secure the long stub 420, that stub being in commonalty to both tube elements 390 and 392, to the central tube members 390 and 392. Left and right ceramic capacitors 422 and 424 secure between double ended capacitor brackets 426 and 428 and beneath dielectric supports 412 and 418 respectively, as well as between the central tube member 390 and stub 420 and between tube member 392 and stub 420. Shorting bar 430 connects between the inner end portion of the central tube element 390 to one end of the dielectric support 414 and to one end of the long hairpin stub 432, while shorting bar 434 connects the opposing end of the hairpin stub 432 to stub 420 and the opposite end of the dielectric support 414. In a similar fashion a shorting bar 436 connects between the inner portion of the central tube member 392 to one end of the dielectric support 416 and to one end of the short hairpin stub 438, while shorting bar 440 connects the opposing end of the hairpin stub 438 to stub 420.

FIG. 6 illustrates a detail view taken along line 6—6 of FIG. 5 of the driven element 302, and in particular shows the arrangement of ceramic capacitors, stubs, hairpin stubs and associated components.

FIG. 7 illustrates a detail view taken along line 7—7 of FIG. 5, and illustrates in particular the arrangement of ceramic capacitors, stubs, hairpin stubs and associated components.

MODE OF OPERATION

The antenna array is a two-element directional, parasitic array for the 10, 12, 15 and 20 meter amateur bands, as illustrated, having a wind span of approximately 3.8 meters and a boom length of approximately 1.8 meters. The reduction and element length is accomplished by a combination of fanned elements that increase the effective element diameter/length ratio and the LC circuits that employ short stub inductances and low loss ceramic capacitors for the least possible RF loss. The complete butterfly elements are active on each band. This results in efficient operation and in considerably greater VSWR band width. The proper procedure for adjusting the antenna for proper SWR is to adjust first for 20 meters, than for 15 meters, and finally for 10 meters. The clamp assemblies determine the SWR curve on the driven element. The 15 meter tuning can be adjusted by moving the stub 356 accordingly. Likewise, if a 17 meter coil and capacitor assembly was installed on the right-hand side, cross element 344, than the stub 364 would be positioned accordingly. For tuning in the 12 meter range, the tuning is quite broad and the frequency of lowest SWR can be obtained by compressing the coil or extending the coil accordingly. In operation, the parasitic element functions as a director on 12 meters, rather than as a reflector on 20, 15, and 10; therefore, the gain and front-to-back rejection on 12 meters will occur in directions 180 degrees opposite to the performance characteristics on the other three bands. An operator need only make mental correction in aiming the array accordingly. The same, of course, is applicable to the 17 meter coil and capacitors. Other operation of the array of FIGS. 5-7 is similar in theory to that of FIGS. 1-4. The driven element, as well as the reflector elements of FIGS. 5-7 can also be extended to utilization of any number of director elements as may be deemed appropriate.

Various modifications can be made to the present invention without departing from the apparent scope thereof. All of the antenna elements can be the same size with the fact that the amount of stub may be lengthened or shortened to adjust the element accordingly for utilization as a director or reflector, which is about 5-10 percent higher or lower in resonance respectively. This is particularly so when operating on the 15 and 20 meter frequencies. On the 10 meter frequency, it is foreseeable to not utilize the hairpin coil in order to cause the element to resonate as a director or to lengthen it as a reflector element. Also, any suitable capacitor can be utilized in lieu of the doorknob capacitor such as a tubular ceramic capacitor, ceramic capacitor, and other capacitors.

The antenna can utilize a monopole configuration, a dipole configuration, or a beam configuration. The particular frequencies of operation are not limited by this disclosure, and can be adapted accordingly with the teachings of the disclosure. The antenna can resonate one one or on two or more frequencies, and is not limited to those frequencies as described in the disclosure.

What is claimed:
1. Apex feed swept antenna comprising:
   a. cylindrical fiberglass support;
   b. two central tubular elements telescoping over said support;
   c. end elements substantially perpendicular to said central elements, and means for mechanically and electrically affixing said end elements to each end of said central element;
   d. upper and lower swept elements including means for mechanically and electrically securing each of said upper and lower swept elements between ends of each of said end elements and said central elements at junction of said support;
   e. spaced dielectric supports secured to each of said central elements substantially adjacent to said fiberglass support;
   f. short left stub and short right stub connected to each pair of said dielectric support;
   g. capacitors electrically and mechanically secured between an end of each stub and said central element;
   h. first shorting bars secured to each of said central element substantially adjacent to said central element and extending downwardly;
   i. a short hairpin stub and long hairpin stub connected at one end of said shorting bars;

j. second shorting bars connected between another end of said hairpin stubs and to an inner end of said left and right stubs; and, k. means for coupling rf power to said inner ends of said left and right stubs.

2. Antenna of claim 1 wherein said antenna resonates on 10, 15 and 20 meters.

3. Antenna of claim 2 wherein said antenna resonates on 12 meters.

4. Antenna of claim 1 including two capacitors and a coil in between and connected to a mid-portion of said short left stub.

5. Antenna of claim 1 wherein a reflector element is spaced on a boom from said apex feed swept antenna and comprises:

a. cylindrical fiberglass support;

b. two central tubular elements telescoping over said support;

c. end elements substantially perpendicular to said central elements, and means for mechanically and electrically affixing said end elements to each end of said central element;

d. upper and lower swept elements including means for mechanically and electrically securing each of said upper and lower swept elements between ends of each of said end elements and said central elements at junction of said support;

e. spaced dielectric supports secured to each of said central elements substantially adjacent to said fiberglass support;

f. a stub connected between each pair of said dielectric support;

g. capacitors electrically and mechanically secured between an end of each stub and said central element;

h. first shorting bars secured to each of said central element substantially adjacent to said central element and extending downwardly;

i. a short hairpin stub and long hairpin stub connected at one end of said shorting bars; and, j. second shorting bars connected between another end of said hairpin stubs and to an inner end of said left and right stubs.

* * * * *